United States Patent [19]

Chiodini et al.

[11] Patent Number: 5,409,998
[45] Date of Patent: Apr. 25, 1995

[54] COMPOSITIONS OF IONICALLY CURABLE FLUOROELASTOMERIC POLYMERS

[75] Inventors: Graziella Chiodini, Saronno; Anna Minutillo, Milan, both of Italy

[73] Assignee: Ausimont S.p.A., Milan, Italy

[21] Appl. No.: 133,625

[22] Filed: Oct. 8, 1993

[30] Foreign Application Priority Data

Oct. 12, 1992 [IT] Italy .............................. MI92A2338

[51] Int. Cl.⁶ .............................................. C08F 8/00
[52] U.S. Cl. ................................. 525/375; 525/326.3
[58] Field of Search ......................................... 525/375

[56] References Cited

U.S. PATENT DOCUMENTS

| | | |
|---|---|---|
| 3,655,727 | 4/1972 | Patel et al. . |
| 3,686,143 | 8/1972 | Bowman . |
| 3,712,877 | 1/1973 | Patel et al. . |
| 3,752,787 | 8/1973 | de Brunner . |
| 3,857,807 | 12/1974 | Kometani et al. . |
| 3,876,654 | 4/1975 | Pattison . |
| 3,931,125 | 1/1976 | Kometani et al. .................. 525/375 |
| 3,933,732 | 1/1976 | Schmiegel . |
| 4,233,421 | 11/1980 | Worm . |
| 4,259,463 | 3/1981 | Moggi et al. . |
| 5,319,025 | 6/1994 | Weigelt .............................. 525/375 |

FOREIGN PATENT DOCUMENTS

| | | |
|---|---|---|
| 335705 | of 0000 | European Pat. Off. . |
| 120462 | 10/1984 | European Pat. Off. . |
| 182299 | 5/1986 | European Pat. Off. . |
| 0373973 | 6/1990 | European Pat. Off. . |
| 3805792 | 9/1988 | Germany . |
| 3915318 | 12/1989 | Germany . |

OTHER PUBLICATIONS

Abstract of JP-A-02 240 130, Abstract of Japan, Abstract vol. 014559.
Derwent Abstract of JP-A-5 061 236, AN 93-122246.
European Search Report dated Jan. 18, 1994 for EP 93 11 6130 with Annex.

*Primary Examiner*—Bernard Lipman
*Attorney, Agent, or Firm*—Mark E. Waddell; Bryan Cave

[57] ABSTRACT

Ionically curing of VDF-containing fluoroelastomers selected from the ones containing less than 60 moles % of VDF and from the ones containing hydrogenated olefins is improved by using, as accelerators, triazinic compounds of formula:

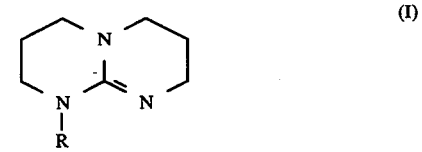

(I)

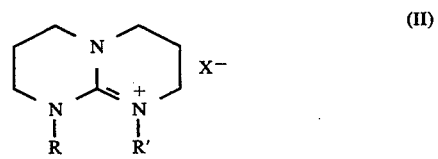

(II)

($R=H$, $C_1$-$C_4$ alkyl; $R'=R$ or benzyl, arylalkyl; $X=Cl$, Br, I, a bisphenoxy radical or $O-CH_2RF-CH_2R_2$; Rf=a perfluorooxyalkylene chain; $R_2=-OH$, $-O^-$).
What is claimed are the fluoroelastomeric compositions containing said accelerators.

15 Claims, No Drawings

COMPOSITIONS OF IONICALLY CURABLE FLUOROELASTOMERIC POLYMERS

The present invention relates to compositions of ionically curable fluoroelastomeric polymers, comprising particular curing accelerators.

As is known, —fluoroelastomeric polymers are ionically curable by means of a combination of a cross-linking agent, which generally is a polyhydroxylic compound such as Bisphenol AF, and of a curing accelerator.

As curing accelerators there are used, or are suggested in the art, aminophosphonium compounds (U.S. Pat. No. 4,259,463), phosphoranes (U.S. Pat. No. 3,752,787), and the organoonium compounds in general, as are described in U.S. Pat. Nos. 3,655,727, 3,712,877, 3,857,807, 3,686,143, 3,933,732, 3,876,654, 4,233,421, and in European patent applications 182,299, 120,462 and 335,705.

curing of fluoroelastomeric copolymers such as for example the ones composed of vinylidene fluoride (VDF), hexafluoropropene (HFP) and tetrafluoroethylene (TFE), having a low VDF content, is, however, difficult when the abovesaid accelerators are utilized.

The same difficulty in the curing with such accelerators is exhibited by the fluoroelastomeric copolymers containing hydrogenated olefins, as are described for example in EP-A-335,705, owing to the particular stability of their polymeric chain to the nucleophilic compounds. Such fluoroelastomeric copolymers include monomeric units derived from vinylidene fluoride, tetrafluoroethylene, and copolymerizable hydrocarbon olefins.

However, such fluoroelastomers can be easily cured with peroxides, after suitable peroxide curing sites have been introduced into the macromolecule.

It has now been found by the Applicant that fluoroelastomeric copolymers containing monomeric VDF units, selected from the ones containing less than 60 moles % of VDF and free from units deriving from hydrogenated olefins, and from the ones which, irrespectively of the VDF unit amount, contain monomeric units deriving from hydrogenated olefins, can be easily ionically vulcanized by means of conventional hydroxylated cross-linking agents, utilizing, as an accelerator, a triazinic compound having general formula:

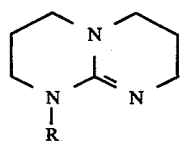  I)

(R=H, C$_1$-C$_4$ alkyl) or

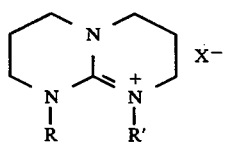  II)

(R=H, C$_1$-C$_4$ alkyl)
(R'=H, C$_1$-C$_4$ alkyl, benzyl, C$_7$-C$_{11}$ arylalkyl);
X=Cl, Br, 1, or a bisphenoxy radical

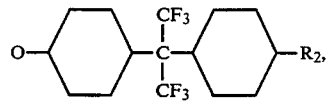

or a radical of formula O—CH$_2$—Rf—CH$_2$—R$_2$, where: Rf=a perfluoropolyoxyalkylene chain having an average molecular weight ranging from 350 to 2,000, and comprising perfluorooxyalkylene units of formula (—CF$_2$CF$_2$O)— and/or

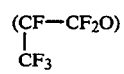

and/or (CF$_2$O) and/or

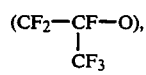

R$_2$=—OH, O$^-$ or X can be whatsoever a counterion of the type described in U.S. Pat. No. 4,259,463 for the related aminophosphonium compounds, such as for example the tetrafluoroborate (BF$_4^-$) and hte hexafluorophosphate (PF$_6^-$) groups or the ZnCl$_4^-$ and CdCl$_4^-$ complexes.

Thus, object of the present invention are the compositions based on fluoroelastomeric copolymers containing VDF units, selected from:

a) the copolymers containing less than 60 moles % of VDF, free from monomeric units deriving from hydrogenated olefins, and b) the copolymers containing monomeric units deriving from hydrogenated olefins, irrespectively of the VDF amount, which are ionically curable and contain, as curing accelerators, at least a compound comprised in general formulas (I) and/or (II) defined hereinbefore.

Such compound can be present in the abovesaid compositions in amounts ranging from 0.2 to 1, but preferably from 0.35 to 0.60 parts by weight on 100 parts by weight of copolymer.

The fluoroelastomeric copolymers having a VDF content lower than 60 moles %, which are therefore curable, are composed of monomeric units deriving from VDF, with at least another monomer such as HFP, hydropentafluoropropene (HFPE), TFE, chlorotrifluoroethylene (CTFE), perfluoroalkylvinylether (PAVE).

Examples of such elastomers are the VDF/HFP/TFE copolymers, such as, for example, a few products marketed under the trade-names Dai-el (Daikin), Fluorel (3M), Tecnoflon (Montedison), Viton (du Pont); the copolymers described in Italian patent applications Nos. 2040 A/91, 2041 A/91 and 1244 A/92 in the name of the Applicant, containing VDF amounts lower than 60 moles %.

The fluoroelastomeric copolymers containing monomeric units deriving from hydrogenated olefins, curable with the abovesaid accelerators, comprise the copolymers having the following molar composition:

| | |
|---|---|
| VDF | 4–75% |
| HFP and/or PAVE and/or HFPE and/or CTFE | 0–40% |
| Ol (olefin containing 1–4 C) | 2–35% |

-continued

| | |
|---|---|
| TFE | 0-60% |

Advantageously cured are, in particular, the copolymers containing not more than 40 moles % of VDF and hydrogenated olefin in amounts from 5 to 25 moles %, described for example in Italian patent application No. 1339 A/91 in the name of the Applicant, or the copolymers containing units of VDF, TFE and propylene cited in EP-A-335,705, containing 30–36 moles % of VDF, 41–45 moles % of TFE and 19–28 moles % of $C_3H_6$.

The following examples are given to illustrate the present invention, but not to limit the scope thereof.

EXAMPLES 1-2

These examples refer to the cure of copolymers, the composition of which is reported in Table 1. In said Table, —the characteristics of the curing formulation as well as the ones of the cured products according to the art (a) and according to the invention (b) are indicated too.

TABLE 1

| | EXAMPLES | | | |
|---|---|---|---|---|
| | 1 | | 2 | |
| | (a) | (b) | (a) | (b) |
| COPOLYMER COMPOSITION (MOLES %) | | | | |
| VDF | 79.4 | 79.4 | 52.3 | 52.3 |
| HFP | 20.6 | 20.6 | 24.2 | 24.2 |
| TFE | — | — | 23.5 | 23.5 |
| FLUORINE CONTENT (% BY WEIGHT) | 65.7 | 65.7 | 70.1 | 70.1 |
| MOONEY VISCOSITY ML (1 + 10, 121° C.) (ASTM D 1646-82) | 29 | 29 | 86 | 86 |
| CURING FORMULATION AND RHEOLOGICAL PROPERTIES | | | | |
| COPOLYMER (g) | 100 | 100 | 100 | 100 |
| BISPHENOL AF (phr) | 2 | 2 | 2.7 | 2.7 |
| MgO DE (phr) | 3 | 3 | 3 | 3 |
| Ca(OH)$_2$ (phr) | 6 | 6 | 6 | 6 |
| CARBON BLACK N 990 MT (phr) | 30 | 30 | 30 | 30 |
| GM102E (PHOSPHORANAMINE) (phr) | 0.45 | — | 1.36 | — |
| TBD (TRIAZODICYCLODECENE) (phr) | — | 0.16 | — | 0.5 |
| MOONEY VISCOSITY ML (1 + 10) 121° C. (ASTM D 1646-82) | 61 | 58 | 156 | 116 |
| MOONEY SCORCH MS at 135° C. | | | | |
| MOONEY VISCOSITY MINIMUM (MV) | 27 | 24 | 78 | 42 |
| TIME REQUIRED FOR A 15-POINT INCREASE (minutes/seconds) (ASTM D 1646-82) | 30'06" | 81'36" | 17'30" | 23'06" |
| ODR 177° C., ARC 3° (ASTM D 2084-81) | | | | |
| ML (pound.inch) | 10 | 8 | 29 | 12 |
| MH (pound.inch) | 108 | 60 | 89 | 106 |
| ts$_2$ sec. | 129 | 216 | 129 | 171 |
| ts$_{10}$ sec. | 156 | 336 | 165 | 189 |
| ts$_{50}$ sec. | 180 | 699 | 231 | 222 |
| t'$_{90}$ sec. | 213 | 651 | 249 | 321 |
| V$_{MAX}$ pound.inch/sec. | 2.86 | 0.15 | 0.76 | 1.45 |
| MECHANICAL PROPERTIES OF THE COPOLYMER AFTER CURING IN PRESS AT 170° C. FOR 10 MINUTES (ASTM D 412-83) | | | | |
| 100% MODULUS (MPa) | 4.3 | — | 6 | 6.1 |
| TENSILE STRENGTH (MPa) | 11.2 | — | 10.4 | 10.7 |
| ELONGATION AT BREAK (%) | 264 | — | 285 | 253 |
| SHORE HARDNESS A (POINTS) | 71 | — | 82 | 78 |
| MECHANICAL PROPERTIES AFTER POSTCURING IN OVEN AT 230° C. FOR 24 HOURS (8-HOUR RISE) (ASTM D 412-83) | | | | |
| 100% MODULUS (MPa) | 5.9 | — | 8.5 | 16.3 |
| TENSILE STRENGTH (MPa) | 15.6 | — | 16.2 | 19.2 |
| ELONGATION AT BREAK (%) | 210 | — | 226 | 117 |
| SHORE HARDNESS A (POINTS) | 72 | — | 82 | 83 |
| COMPRESSION SET (70 HOURS AT 200° C.) OF THE COPOLYMER AFTER POSTCURING | | | | |
| O-RINGS (ASTM D 395/B) (%) | 16 | — | 57 | 51 |
| COMPRESSION SET (22 HOURS AT 150° C. + 2-HOUR UNDER COMPRESSION | | | | |

TABLE 1-continued

|  | EXAMPLES | | | |
|---|---|---|---|---|
|  | 1 | | 2 | |
|  | (a) | (b) | (a) | (b) |
| DISC (%) (13.6 × 6 mm) (ASTM D 395/B) | — | — | 74 | 37 |

*Properties not determinable owing to insufficient cross-linking and consequent defects in the cured test pieces.
NOTE:
GM 102E is the phosphoranamine of formula

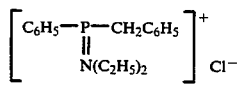

TBD = compound of formula

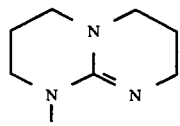

phr = per hundred rubber

EXAMPLES 3-4

For these examples, a copolymer having the following composition in moles per cent

| VDF | 31.5 |
|---|---|
| HFP | 7.5 |
| TFE | 26.0 |
| MVE | 15.0 |
| E (Ethylene) | 20.0 | and having a fluorine content equal to 65.3% by weight and a Mooney viscosity ML (1+10) at 121° C. =40 was used.

The characteristics of the curing compositions and of the cured products according to the prior art (tests (a)) and according to the invention (tests (b)) are reported in Table 2.

TABLE 2

|  | EXAMPLES | | | |
|---|---|---|---|---|
|  | 3 | | 4 | |
|  | (a)* | (b) | (a)* | (b) |
| CURING FORMULATION AND RHEOLOGICAL PROPERTIES | | | | |
| COPOLYMER (g) | 100 | 100 | 100 | 100 |
| BISPHENOL AF (phr) | 2.5 | 2.5 | 2.5 | 2.5 |
| MgO DE (phr) | 6 | 6 | 6 | 6 |
| Ca(OH)₂ (phr) | 6 | 6 | 6 | 6 |
| CARBON BLACK N 990 MT (phr) | 30 | 30 | 30 | 30 |
| SULPHOLANE (phr) | — | — | 0.5 | 0.5 |
| GM102E (phr) | 1.10 | — | 1.10 | — |
| TBD (phr) | — | 0.39 | — | 0.39 |
| MOONEY VISCOSITY ML (1 + 10) 121° C. | — | — | — | 64 |
| MOONEY SCORCH MS at 135° C. | | | | |
| MOONEY VISCOSITY MINIMUM | 34 | 26 | — | 25 |
| TIME REQUIRED FOR A 15-POINT INCREASE (minutes) (ASTM D 1646-82) | >60' | 51' 45" | — | 45' 15" |
| ODR 177° C., ARC 3°, 24' | | | | |
| ML pound.inch (ASTM D 2084-81) | — | 6 | — | 6 |
| MH pound.inch | — | 67 | — | 66 |
| ts₂ sec. | — | 318 | — | 288 |
| ts₁₀ sec. | — | 396 | — | 342 |
| ts₅₀ sec. | — | 858 | — | 762 |
| t'₉₀ sec. | — | 1044 | — | 924 |
| V$_{MAX}$ pound.inch/sec. | — | 0.16 | — | 0.27 |

*No cross-linking

TABLE 2-continued was observed.

|  | EXAMPLES | | | |
|---|---|---|---|---|
|  | 4 | | 5 | |
|  | (a)* | (b) | (a)* | (b) |
| MECHANICAL PROPERTIES OF THE COPOLYMER AFTER PRESS CURING AT 170° C. FOR 10 MINUTES (ASTM D 412-83) | | | | |
| 100% modulus (MPa) | — | 4.2 | — | 4.4 |
| TENSILE STRENGTH (MPa) | — | 10.6 | — | 10.4 |
| ELONGATION AT BREAK (%) | — | 216 | — | 304 |
| SHORE HARDNESS A (points) | — | 74 | — | 75 |
| MECHANICAL PROPERTIES AFTER POST-CROSS-LINKING IN OVEN AT 230° C. FOR 24 HOURS (8-HOUR RISE) (ASTM D 412-83) | | | | |
| 100% MODULUS (MPa) | — | 12.1 | — | 13.5 |
| TENSILE STRENGTH (MPa) | — | 16.1 | — | 17.5 |
| ELONGATION AT BREAK (%) | — | 127 | — | 124 |
| SHORE HARDNESS A (points) | — | 79 | — | 81 |
| COMPRESSION SET (22 HOURS AT 150° C. + 2-HOUR COOLING UNDER COMPRESSION | | | | |
| DISC (%) (13.6 × 6 mm) (ASTM D 395/B) | — | 44 | — | 38 |

*Characteristics not determinable owing to absence of cross-linking.

EXAMPLE 5

For this example, a copolymer having the following molar per cent composition:

| VDF | 22 |
|---|---|
| TFE | 46 |
| P (propylene) | 32 | was used.

The characteristics of the curing composition and of the cured products according to the prior art (a) and according to the invention (b) are reported in Table 3.

TABLE 3

|  | EXAMPLE 5 | |
|---|---|---|
|  | (a)* | (b) |
| CURING FORMULATON AND RHEOLOGICAL PROPERTIES | | |
| POLYMER (g) | 100 | 100 |
| BISPHENOL AF (phr) | 1.3 | 1.3 |
| MgO DE (phr) | 3 | 3 |
| Ca(OH)$_2$ (phr) | 6 | 6 |
| CARBON BLACK N 990 MT (phr) | 30 | 30 |
| SULPHOLANE (phr) | 2 | 2 |
| GM102E (phr) | 0.77 | — |
| TBD (phr) | — | 0.28 |
| ODR 177° C., ARC 3°, 24' (ASTM D 2084-81) | | |
| ML (pound.inch) | — | 11 |
| MH (pound.inch) | — | 68 |
| ts$_2$ sec. | — | 177 |
| ts$_{10}$ sec. | — | 252 |
| ts$_{50}$ sec. | — | 456 |
| t'$_{90}$ sec. | — | 477 |
| V$_{MAX}$ pounds.inch/sec. | — | 0.27 |

*No cross-linking was observed.

EXAMPLES 6-9

These examples refer to the curing of the copolymer utilized in examples 3 and 4 by using, as accelerators, triazinic compounds according to the invention.

The characteristics of the curing compositions and of the cured products are reported in Table 4.

TABLE 4

|  | EXAMPLES | | | |
|---|---|---|---|---|
|  | 6 | 7 | 8 | 9 |
| CURING FORMULATION AND RHEOLOGICAL PROPERTIES | | | | |
| POLYMER (g) | 100 | 100 | 100 | 100 |
| BISPHENOL AF (phr) | 2 | 2 | 2 | 0.55 |
| MgO DE (phr) | 6 | 6 | 6 | 6 |
| Ca(OH)$_2$ (phr) | 6 | 6 | 6 | 6 |
| CARBON BLACK N 990 MT (phr) | 30 | 30 | 30 | 30 |
| SULPHOLANE (phr) | 0.5 | 0.5 | — | — |
| TBD (phr) | 0.5 | — | — | — |
| modified TBD (phr) | — | 0.95 | — | — |
| TBD HYDROCHLORIDE (phr) | — | — | 0.63 | — |
| TBD/BISPHENOL AF ADDUCT (phr) | — | — | — | 1.95 |
| MOONEY VISCOSITY ML (1 + 10) 121° C. (ASTM D 1646-82) | 53 | 60 | 60 | 60 |
| MOONEY SCORCH MS at 135° C. | | | | |
| MOONEY VISCOSITY MINIMUM ("MOONEY) | 22 | — | — | — |
| TIME REQUIRED FOR A 15-POINT INCREASE (minutes) (ASTM D 1646-82) | 14' 45" | — | — | — |
| ODR at 177° C., ARC 3°, 24' | | | | |
| ML (pound.inch) (ASTM D 2084-81) | 7 | 9 | 8 | 6 |
| MH (pound.inch) | 61 | 72 | 55 | 51 |
| ts$_2$ sec. | 105 | 87 | 75 | 132 |
| ts$_{10}$ sec. | 126 | 102 | 96 | 162 |
| ts$_{50}$ sec. | 483 | 282 | — | — |
| t'$_{90}$ sec. | 450 | 429 | 492 | 516 |
| V$_{MAX}$ pound.inch/sec. | 0.45 | 0.69 | 0.39 | 0.29 |

TBD: formula (I), R = H
Modified TBD: formula (II); R = H; R' = benzyl; X$^-$ = Cl$^-$
TBD hydrochloride: formula (II); R = H;

TABLE 4-continued

| TBD/bisphenol AF adduct: | R' = H; X$^-$ = Cl$^-$ formula (II); R = H; R' = H; X$^-$ = bisphenoxy | | | |
|---|---|---|---|---|
|  | EXAMPLES | | | |
|  | 7 | 8 | 9 | 10 |
| MECHANICAL PROPERTIES AFTER PRESS CURING AT 170° C. FOR 10 MINUTES | | | | |
| 100% MODULUS (MPa) | 4.5 | 4.5 | 4.1 | 3.9 |
| TENSILE STRENGTH (MPa) | 10.1 | 10.1 | 8.9 | 9.4 |
| ELONGATION AT BREAK (%) | 285 | 336 | 349 | 364 |
| SHORE HARDNESS A (POINTS) | 73 | 74 | 71 | 70 |
| MECHANICAL PROPERTIES AFTER POST-CURING IN OVEN AT 200° C. FOR 24 HOURS (8-HOUR RISE) | | | | |
| 100% MODULUS (MPa) | 13.1 | 8.5 | 8.3 | 10.1 |
| TENSILE STRENGTH (MPa) | 17.7 | 16.6 | 14.4 | 16.3 |
| ELONGATION AT BREAK (%) | 130 | 205 | 188 | 159 |
| SHORE HARDNESS A (POINTS) | 80 | 79 | 79 | 77 |
| COMPRESSION SET (22 HOURS AT 150° C. + 2-HOUR COOLING UNDER COMPRESSION | | | | |
| DISC (%) (13.6 × 6 mm) (ASTM D 395/B) | 51 | 56 | 72 | 52 |

EXAMPLES 11-13 (comparison with conventional guanidines as accelerators)

For these examples, the copolymer of examples 3-4 was used.

The characteristics of the curing compositions and the results of the curing are reported in Table 5.

TABLE 5

|  | EXAMPLES | | |
|---|---|---|---|
|  | 11 | 12 | 13 |
| CURING FORMULATION AND RHEOLOGICAL PROPERTIES | | | |
| POLYNER (g) | 100 | 100 | 100 |
| BISPHENOL AF (phr) | 2.5 | 2.5 | 2.5 |
| MgO (phr) | 6 | 6 | 6 |
| Ca(OH)$_2$ (phr) | 6 | 6 | 6 |
| CARBON BLACK N 990 MT (phr) | 30 | 30 | 30 |
| SULPHOLANE (phr) | 0.5 | 0.5 | 0.5 |
| 1,1,-3,3-tetramethylguanidine (phr) | 0.33 | — | — |
| 1,3-diphenylguanidine (phr) | — | 0.59 | — |
| 1,3-di-o-tolylguanidine (phr) | — | — | 0.67 |
| ODR at 177° C. ARC 3°,24' | * | * | * |
| ML (pound.inch) | 8 | 12 | 9 |
| MH (pound.inch) | 36 | 17 | 15 |
| ts$_2$ sec. | — | — | — |
| ts$_{10}$ sec. | — | — | — |
| ts$_{50}$ sec. | — | — | — |
| t'$_{90}$ sec. | — | — | — |
| V$_{MAX}$ pound.inch/sec. (ASTM D 2084-81) | — | — | — |

*The polymeric compositions did not exhibit any significant curing.

EXAMPLES 13-16 (comparison with conventional accelerators)

For these examples, the copolymer of examples 3-4 was used.

The curing formulations and their rheological properties are reported in Table 6.

TABLE 6

| | \_\_\_\_\_ EXAMPLES \_\_\_\_\_ | | | |
|---|---|---|---|---|
| | 1 | 2 | 3 | 4 |
| COPOLYMER (g) | 100 | 100 | 100 | 100 |
| BISPHENOL AF (phr) | 2.5 | 2.5 | 2.5 | 2.5 |
| Benzyltriphenylphosphonium chloride (phr) | 1.09 | — | — | — |
| GM104** (phr) | — | 0.96 | — | — |
| DBUCl** (phr) | — | — | 0.78 | — |
| PPN BF4** (phr) | — | — | — | 1.75 |
| MgO D (phr) | 6 | 6 | 6 | 6 |
| Ca(OH)$_2$ (phr) | 6 | 6 | 6 | 6 |
| SULPHOLANE (phr) | 0.5 | 0.5 | 0.5 | 0.5 |
| CARBON BLACK MT N990 (phr) | 30 | 30 | 30 | 30 |
| ODR at 177° C., ARC 3°, 12' | (*) | (*) | (*) | (*) |
| ML (pounds.inch) | 10 | 10 | 10 | 10 |
| MH (pounds.inch) | 21 | 13 | 28 | 15 |
| ts$_2$ sec. | — | — | — | — |
| ts$_{10}$ sec. | — | — | — | — |
| ts$_{50}$ sec. | — | — | — | — |
| t'$_{50}$ sec. | — | — | — | — |
| t'$_{90}$ sec. | — | — | — | — |
| V$_{MAX}$ (pounds.inch/sec) (ASTM D 2084-81) | — | — | — | — |

(*)No significant curing observed.
**GM104 = Tris(dimethylamino)-benzyl phosphonium tetrafluoroborate
DBUCl = N-benzyl-1,8-diazodicyclo (5,4,0) undec-7-ene chloride
1 — PPN BF4 = [φ$_1$-P=N=P-φ$_3$]$^+$ BF$_4^-$

We claim:

1. Compositions comprising fluoroelastomeric copolymers, the fluoroelastomeric copolymers being selected from the group consisting of:
   a) copolymers containing monomeric units derived from vinylidene fluoride and from at least one other fluorinated olefin, the copolymers containing less that than 60 moles percent of vinylidene fluoride monomeric units and being free from monomeric units derived from hydrogenated olefins; and
   b) copolymers containing monomeric units derived from vinylidene fluoride and monomeric units derived from hydrogenated olefins,
the compositions being ionically curable and further comprising a curing accelerator which is a compound of the formula:

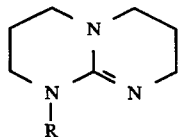     I)

where R=H or an alkyl containing 1 to 4 carbon atoms, or the formula

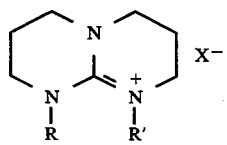     II)

where
R=H, or an alkyl containing 1 to 4 carbon atoms,
R'=H, or an alkyl containing 1 to 4 carbon atoms, a benzyl, an arylalkyl containing 7 to 11 carbon atoms, X=Cl, Br, I or a bisphenoxy radical of formula

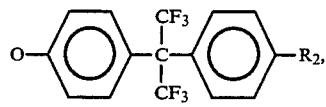

or a radical of formula —O—CH$_2$—Rf—CH$_2$—R$_2$ wherein:
Rf=a perfluoropolyoxyalkylene chain having an average molecular weight ranging from 350 to 2,000, and comprising perfluorooxyalkylene units of formula (—CF$_2$CF$_2$O—) and/or

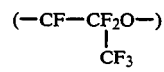

and/or (—CF$_2$O—) and/or

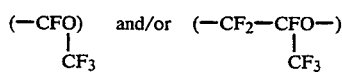

R$_2$=—OH, —O$^-$,
or X can be a counterion of formula BF$_4^-$, PF$_6^-$, ZnCl$_4^-$, CdCl$_4^-$.

2. Compositions according to claim 1, wherein the accelerator is triazodicyclodecene.

3. The compositions of claim 2, wherein the fluoroelastomeric copolymer is of type (a) and is composed of monomeric units derived from vinylidene fluoride with at least another monomer selected from hydrofluoropropene, hydropentafluoropropene, trifluoroethylene, chlorotrifluoroethylene, and perfluoroalkylvinylether.

4. The compositions of claim 2, wherein the fluoroelastomeric copolymer is of type (b) and comprises:
   4–75 moles % of vinylidine fluoride,
   2–35 moles % of olefin containing 1 to 4 carbon atoms,
   0–60 moles % of trifluoroethylene, and
   0–40 moles % of at least one monomer selected from hydrofluoropropene, hydropentafluoropropene, chlorotrifluoroethylene, and perfluoroalkylvinylether.

5. The compositions of claim 4, wherein the fluoroelastomeric copolymer comprises not more than 40 moles % of vinylidine fluoride and from 5 to 25 moles % of hydrogenated olefin.

6. The compositions of claim 4, wherein the fluoroelastomeric copolymer comprises 30–36 moles % of vinylidine fluoride, 41–45 moles % of trifluoroethylene and 19–28 moles % of propylene.

7. The compositions of claim 2, wherein the accelerating compound of formula (I) is contained in amounts ranging from 0.2 to 1% by weight on 100 parts by weight of fluoroelastomeric copolymer.

8. The composition of claim 2, further comprising an organic polyhydroxylic compound as cross-linking agent. Milan, 9. Compositions according to claim 2, wherein said fluoroelastomeric copolymers:
   are free from monomeric units derived from hydrogenated olefins;
   include vinylidene fluoride monomeric units;
   include monomeric units of at least one other fluorinated olefin selected from the group consisting of hydrofluoropropene, hydropentafluoropropene, trifluoroethylene, chlorotrifluoroethylene, and perfluoroalkylvinylether; and include less than 60 moles percent of the monomeric units of the copolymers as vinylidene fluoride monomeric units.

10. Compositions according to claim 9, wherein said fluoroelastomeric copolymers include monomeric units of vinylidine fluoride, hydrofluoropropene, and trifluoroethylene.

11. Compositions according to claim 2, wherein said fluoroelastomeric copolymers include monomeric units derived from vinylidene fluoride and monomeric units derived from hydrogenated olefins.

12. Compositions according to claim 11, wherein said hydrogenated olefins have from 1 to 3 carbon atoms.

13. Compositions according to claim 12, further including monomeric units of at least one other fluorinated olefin selected from the group consisting of hydrofluoropropene, hydropentafluoropropene, trifluoroethylene, chlorotrifluoroethylene, and perfluoroalkylvinylether.

14. Compositions according to claim 13, including monomeric units of trifluoroethylene and further including monomeric units of at least one other fluorinated olefin selected from the group consisting of hydrofluoropropene, hydropentafluoropropene, chlorotrifluoroethylene, and perfluoroalkylvinylether.

15. Compositions according to claim 7, wherein the accelerating compound of formula I is contained in amounts ranging from 0.35 to 0.60 parts by weight on 100 parts per weight of fluoroelastomeric copolymer.

* * * * *